United States Patent Office 3,778,364
Patented Dec. 11, 1973

3,778,364
RADIATION PROCESS FOR MAKING PLASTIC PAPER CONTAINING EXPANDABLE, THERMOPLASTIC MICROSPHERES
Inder Mani and George J. Atchison, Midland, Mich., assignors to The Dow Chemical Corporation, Midland, Mich.
No Drawing. Filed Jan. 10, 1972, Ser. No. 216,745
Int. Cl. B01j 1/00, 1/16
U.S. Cl. 204—159.15                       12 Claims

ABSTRACT OF THE DISCLOSURE

A mixture containing a component polymerizable upon exposure to ionizing radiation and expandable thermoplastic microspheres is cast as a film. Preferably the mixture contains an inorganic filler such as calcium carbonate. The microspheres are caused to expand while the film is exposed in an inert atmosphere to a sufficient amount of ionizing radiation to polymerize the mixture. The resultant product is a plastic paper having an excellent writing and printing surface. The polymerizable component comprises hydroxyalkyl acrylate monomer and may also contain minor amounts of a copolymerizable monomer and/or a resin having two or more polymerizable unsaturated groups such as an unsaturated polyester resin.

BACKGROUND OF THE INVENTION

This invention relates to the area of plastic paper or paper substitutes and concerns a novel process for making same and the product thereof.

Considerable interest has been generated in the possibilities of replacing cellulose fiber based paper with synthetic or plastic paper. Because of economics this interest is directed for the present at high quality papers such as art paper, map paper, labels, catalogue, poster, packet, wrapper and a variety of special uses where the advantages of a plastic overcome the economics and disadvantages of cellulose based paper.

Part of the stimulus for this interest is the rising costs of cellulose pulp, the decreasing supply of raw material especially in some countries such as Japan and others where the supply is limited or even nonexistent, the large capital expense involved in manufacturing pulp and paper, and of increasing concern is the ecological problems associated with pulping chemicals and the huge quantities of water required. Plastic paper offers an attractive way to minimize or completely eliminate such problems and accordingly offers the advantage that a plant to manufacture plastic paper can be located wherever the market exists and does not have to be located close to a large water supply and the raw material source. Another stimulus to developing plastic paper is that cellulose paper, while relatively cheap, has numerous disadvantages especially in the speciality paper and high quality paper markets such as moisture sensitivity, limited resistance to oils, greases and the like, dimensional stability, strength and the like.

Early attempts to make a synthetic paper employed plastic fibers in place of cellulose fibers by the more conventional process of making a fibrous web. (See, for example U.S. 2,844,491 and U.S. 3,193,447.) Other efforts were directed towards making plastic films more suitable for paper uses, per se, as opposed to other film uses as packaging. Either for improving the printability of a packaging film or for use as a paper substitute one approach has been to modify the surface of the film such as treating the surface by corona discharge. Most approaches are directed towards providing a matte surface such as by coating the film with pigments, solvent treatment of the surface or by dispersing a pigment in the film to provide the necessary opacity. In the latter case it is found necessary to biaxially stretch the film to roughen the surface (see, for example U.S. 3,154,461, and Chemical and Engineering News, Jan. 12, 1970, pages 14 and 15).

It would be desirable to have a fast, direct and continuous method for making a plastic paper which does not require stretching, coating, solvent treating or the like to produce a paper-like writing surface.

SUMMARY OF THE INVENTION

Accordingly, the above benefits and advantages are achieved in a method for making plastic paper which comprises forming a film of a mixture comprising from about 30 to 95 weight percent of a film forming component which is readily polymerizable upon exposure to ionizing radiation, 0 to about 65 weight percent of an inorganic filler and about 5 to 25 weight percent of expandable thermoplastic microspheres while exposing the film in an inert atmosphere to a sufficient amount of ionizing radiation to polymerize the mixture. The cured film is a plastic paper having an excellent writing and printing surface.

The film forming component comprises about 75 to 100 weight percent of a hydroxyalkyl acrylate having an alkyl group of 2 to about 8 carbons, 0 to about 15 weight percent of a resin having two or more free radical polymerizable unsaturated groups per molecule and 0 to about 10 weight percent of a copolymerizable monomer.

Expandable microspheres are thermoplastic particles having a generally spherical liquid containing space therein, the liquid being a volatile fluid foaming agent which is a non-solvent for the thermoplastic, and said microspheres being thermally expandable, preferably at temperatures of about 130° C. or below.

This invention also contemplates the product of the process wherein the plastic paper contains thermally expanded microspheres dispersed therein and further, preferably containing a dispersed inert filler. The plastic paper needs no further treatment by solvents, biaxial stretching or the like and provides an excellent writing and printing surface.

DESCRIPTION OF THE INVENTION

The process of this invention provides a fast, direct process capable of being automated and operated continuously for making plastic paper. The process further avoids all the disadvantages of making paper from cellulose pulp and employs readily available equipment.

The advantages and benefits of the process and the plastic paper product thereof are the result of employing the expandable thermoplastic microspheres in combination with the film forming component and especially are the result of thermally expanding the microspheres while the cast film is polymerized. The use of pre-expanded microspheres is difficult from a process standpoint since they are very light and bulky, greatly increase the viscosity of the film forming mixture and make formation of a continuous film difficult. In addition, the cured film has a rough and undesirable surface. Alternately, post heating of the cured film to cause expansion of the microspheres does not produce a suitable writing surface. It appears to be necessary to expand the microspheres during the polymerization (curing) of the film. It is to be understood that the term, to thermally expand the microspheres, does not require complete expansion of the microspheres.

The microspheres may be caused to expand in more than one way. The polymerization of the film is an exothermic reaction which may provide sufficient heat to expand the microspheres. To encourage exothermic expansion the film should be cast on a substrate with a low coefficient of thermal conductivity such as wood, glass and most plastics and the cast film should have a thickness of about 10 to 15 mils or greater as heat is dissipated more rapidly from thinner films. Exothermic expansion is also encouraged by employing microspheres which expand at temperatures of about 130° C. or even less. In the event the polymerization exotherm is insufficient, heat may be easily applied to the film during the curing step, e.g., by heating the substrate on which the film is cast or by moving the cast film into a heated chamber wherein it is also exposed to ionizing radiation. Microwave heating may also be effectively employed as a means to supply the necessary heat. Thus it can be seen that the film may be cast on most any kind of a substrate and the process may employ a wide variety of thermoplastic microspheres.

Adhesion of the plastic paper product to the substrate may occur occasionally, especially if the substrate has a rough surface. In such circumstances release agents such as silicones and other common mold release agents which are not soluble in the film forming mixture may be first applied to the surface. Typical silicone release agents include polydimethyl siloxane and polymethyl hydrogen siloxane.

In fact the substrate may be covered with a common pressure sensitive masking tape wherein the parting or release agent applied to the back side (non-adhesion side) functions very well to prevent sticking to the substrate. Typical plastic substrate materials include polyolefins, polycarbonates, ABS terpolymers, Mylar (polyester) and the like. Mylar polyester appears to be an especially suitable substrate because it doesn't need a release agent.

The film, itself, is cured by exposing it in an inert atmosphere to ionizing radiation. By inert it is meant an atmosphere substantially free of oxygen, since oxygen inhibits polymerization at the surface and leaves the cured film with a tacky surface. Curing in a chamber containing a substantially oxygen free atmosphere such as nitrogen, helium, argon and the like meets the above need for an inert atmosphere.

Ionizing radiation includes accelerated particles such as electrons, protons, deuterons, other ions and the like. From a practical standpoint accelerated electrons are preferred since a wide variety of devices are available to provide same, such as the Van de Graff accelerator. Generally the curing is accomplished by exposing the cast film to ionizing radiation having an intensity of at least about 50 microamperes. Following cure by exposure to ionizing radiation the film (the plastic paper) is removed from the substrate.

The process is dependent on employing a film forming mixture which is readily polymerized upon exposure to ionizing radiation and the plastic paper product produced by the process is dependent on the components of the mixture to provide a paper-like surface.

The mixture comprises the following components:

(1) a film-forming component polymerizable upon exposure to ionizing radiation about 30 to 95 weight percent), (2) an inorganic filler (from 0 to about 65 weight percent), and (3) expandable, thermoplastic microspheres (about 5 to 25 weight percent).

Basic to the film-forming component is the use of a hydroxyalkyl acrylate monomer having from 2 to about 8 carbons in the alkyl group and comprising from about 75 to 100 percent of the film-forming component. Typical of such monomers are 2-hydroxyethyl acrylate, 2-hydroxypropyl acrylate, 2-hydroxybutyl acrylate and the like. With monomers having more than 2 carbon alkyl groups the hydroxy group may be located on various carbon atoms such as 3-hydroxypropyl acrylate and the like. Preferably the acrylate monomer has a 2 to 4 carbon alkyl group. In addition to being readily polymerized when exposed to ionizing radiation, the hydroxyalkyl acrylate monomers have a high polymerization exotherm which provides the heat to expand the microsphere component.

The film-forming component may also contain from 0 to about 10 weight percent of a different monomer copolymerizable with the acrylate monomer. A variety of such monomers may be employed in these small proportions and are valuable in altering the properties of the resultant plastic paper. Different monomers include acrylic and methacrylic acids and the various alkyl esters of said acids such as n-butyl acrylate, ethyl acrylate, and the like; hydroxyalkyl methacrylates; acrylonitrile, and methacrylonitrile; vinyl acetate and the like. Typical properties which may be affected by small amounts of these different monomers are toughness, tensile strength and chemical resistance.

Various resins in amounts of 0 to 20 weight percent of the film-forming component, preferably up to 10 percent, may also be employed to improve toughness, strength and other properties. However if the amount of the resin is above the limits set forth the printability of the plastic paper is decreased and may be lost entirely. Preferably the amount of said resin is less than about 10 percent. Useful resins include those having two or more free radical polymerizable unsaturated groups per molecule. One such resin which is commercially available is an unsaturated polyester resin, commonly made by condensing a diol such as ethylene or propylene glycol with a dibasic acid such as maleic and phthalic acids. Usually the anhydrides of the dibasic acids are used when available as well as mixtures of saturated and unsaturated dibasic acids (or anhydrides). Chapter II–1 of the Handbook of Reinforced Plastics by S. Oleesky and G. Mohr, 1964, Reinhold Publishing Corporation describes unsaturated polyesters and their preparation. Numerous other patents, textbooks and periodicals describe these well known resins.

Generally, in the preparation of suitable polyesters, an $\alpha,\beta$-ethylenically unsaturated dicarboxylic acid such as maleic acid, fumaric acid, itaconic acid or the like is esterified with an alkylene glycol or polyalkylene glcyol having a molecular weight of up to 2000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$-unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 10 to 15 percent.

These unsaturated polyesters may be generally prepared by heating a mixture of the polyhydric alcohol with the dicarboxylic acid or anhydride in the proper molar proportions at elevated temperatures, usually at about 150° to 250° C. for a period of time ranging from about 1 to 10 hours. Polymerization inhibitors such as t-butyl catechol may be advantageously added. It is also possible to prepare unsaturated polyesters directly from the appropriate oxide rather than the glycol, e.g., propylene oxide can be used in place of propylene glycol.

When isophthalic unsaturated polyesters are prepared, it is advantageous to use a split glycol technique, e.g., the isophthalic acid is reacted with an amount of glycol sufficient to lower the carboxyl content rapidly then the unsaturated dicarboxylic acid and the remainder of the glycol is added and the reaction continued to the desired percent —COOH. It is well known in the art that temperatures greater than 225° C. are advantageous when producing these isophthalic polyesters.

U.S. 3,560,237 describes another group of polymerizable resins prepared by reacting the hydroxyl group of hydroxyalkyl acrylates and methacrylates with various polyfunctional materials such as dibasic acids (or the chlorides) and polyisocyanates. For example, 0.6 mole of 2-hydroxyethyl acrylate was reacted with 0.3 mole of adipoyl chloride and in another case a prepolymer was made by reacting 20 parts of polypropylene glycol with 14.2 parts of toluene diisocyanate and then the isocyanate groups of the prepolymer were reacted with the hydroxyl groups of 12.4 parts of 2-hydroxyethyl acrylate.

Another useful group of polymerizable resins may be prepared by reacting the epoxide group of a polyepoxide with an acid group of an unsaturated monocarboxylic acid such as acrylic or methacrylic acid. Such resins are described in U.S. 3,367,992; U.S. 3,506,736; U.S. 3,179,623; U.S. 3,256,226 and U.S. 3,377,406 among others. The hydroxyl group formed by the interaction of the epoxide and acid group may be further reacted with dicarboxylic acid anhydrides (U.S. 3,564,074), a vinyl unsaturated halide (U.S. 3,586,526), a saturated acyl halide (U.S. 3,556,529) or a polyisocyanate (U.S. 3,373,221). Similar resins are prepared by reacting a monoepoxide with acrylic or methacrylic acid followed by reaction with a vinyl acyl halide to produce a divinyl compound (U.S. 3,586,528). Another useful group of resins may be prepared by reacting an unsaturated alcohol such as allyl alcohol with a polyisocyanate such as toluene diisocyanate. Such resins are described in U.S. 3,297,745.

Yet another useful group of resins may be prepared by first polymerizing a monomer such as glycidyl methacrylate alone or in mixture with other copolymerizable monomers and thereafter reacting the glycidyl groups with acrylic or methacrylic acids. The resulting resin contains a plurality of unsaturated groups pendant from the polymer backbone (see U.S. 3,530,100 for further details).

All of the above resins are distinctive in that they have two or more free radical polymerizable unsaturated groups per molecule or resin and all of the patents cited above relating to the preparation of the resins are incorporated herein by reference.

All inorganic fillers and pigments commonly employed in the manufacture of cellulose based paper may be employed herein. Typical fillers and pigments are calcium carbonate, kaolin clays, talc, lithopone, titanium dioxide and the like. Said fillers and pigments have a particle size of less than 1 to about 20 microns and higher. It is usually preferred to use fillers and pigments within this size range and more preferred to use particle sizes of about 1 to 5 up to about 1 to 10 microns. The amount of filler varies from 0 to 65 weight percent of the mixture, but preferably varies from about 20 to 50 percent.

Expandable thermoplastic microspheres are known and have been used in combination with cellulose fibers to decrease the weight of cellulose based paper such as is taught in U.S. 3,293,114 and U.S. 3,556,934. Microspherical particles as set forth in U.S. 3,615,972 are generally spherical particles having encapsulated therein as a single, generally spherical occlusion a volatile liquid foaming agent which is a non-solvent for the thermoplastic. The foaming agent becomes gaseous at a temperature below the softening point of the thermoplastic particle. The foaming agent (blowing agent) usually constitutes from about 10 to 25 weight percent of the expandable microsphere and many such useful foaming agents are set forth in U.S. 3,615,972. Particularly advantageous and beneficial are low molecular weight hydrocarbons such as pentanes, butanes and mixtures thereof. Halohydrocarbons such as dichlorotetrafluoroethane may be employed alone or in admixture with other foaming agents. The thermoplastic microspherical particles are insoluble in the film-forming component and are generally impermeable to the liquid foam agent.

The preparation of suitable expandable microspheres is well known to the art and is fully described in U.S. 3,615,972 employing the limited coalescence polymerization technique. A typical preparation is as follows:

A polymerization reactor equipped with an agitator was charged with 100 parts of deionized water and 15 parts of a 30 weight percent colloidal silica dispersion in water ("Ludox HS"). To this was added 2.5 parts of a 10% solution in water of a condensation product of equimolar proportions of diethanol amine and adipic acid having a viscosity of about 100 cps. at 25° C. One part of a solution containing 2.5 weight percent of potassium dichromate was added. The pH of the solution was adjusted to 4 with HCl. An oil phase mixture was prepared from 100 parts of monomer, 0.1 part of benzoyl peroxide catalyst and 20 parts of neopentane. The oil phase mixture was added to the water phase with high speed agitation, e.g. 10,000 r.p.m. The reactor was then sealed and maintained at about 80° C. for 24 hours. The temperature was then lowered and a white, milky liquid was recovered and filtered to remove the microspheres. The microspheres were then air dried at about 30° C. The microspheres had diameters of about 2 to 10 microns.

For use in this invention the microspheres should have diameters of less than one up to about 50 microns or more but preferably have diameters of about 5 to 20 microns.

A large variety of thermoplastic copolymer microspheres may be employed in this invention provided that said microspheres are insoluble in the hydroxyalkyl acrylate film former over the period of time needed to properly mix the components, form the film and move the cast film to the point at which it is exposed to ionizing radiation.

Particularly suitable thermoplastic microspheres are prepared from a mixture of monomers containing from about 65 to 90 weight percent of vinylidene chloride and about 35 to 10 weight percent of acrylonitrile. Such particles readily foam at temperatures between 85° C. and 100° C.

Other suitable microspheres may be prepared from a mixture of about 10 to 90 weight percent styrene and 90 to 10 percent of acrylonitrile. The styrene may be replaced with other like alkenyl aromatic monomers.

Many other types of thermoplastic microspheres which are useful in this invention are disclosed in U.S. 3,615,972, which is incorporated by reference herein. Most of said microspheres are expandable at temperatures of about 100° C. to 130° C. Microspheres which require higher temperatures may also be employed as described previously.

Certain optional ingredients may be employed with the film forming mixture such as thickening agents, colorants, dye receptive agents, encapsulated materials such as are employed in producing no-carbon copy paper, organic fillers such as polyethylene powder, anti-static agents and the like. Various thickening agents may be used such as methyl cellulose, cellulose acetate, a copolymer of styrene and maleic acid, and the like. The use of thickening agents depends on the choice of components of the mixture and on the process. If the time interval between forming the film and curing same is very short then quite fluid mixtures may be employed. As the time interval increases it is advantageous to use a more viscous mixture. Frequently the addition of the resin may increase the viscosity of the mixture sufficiently but thickening agents may also be used with mixtures containing said resin, if desired.

The following non-limiting examples will further illustrate the invention. All parts and percentages are by weight unless otherwise specified.

Example 1

Films were cured in this and subsequent examples, unless otherwise specified, by passing them through a beam of 2 mev. electrons filtered with 0.34 g./cm.$^2$ of Al at a speed of 3.4 cm./sec. and a scan of 12″. With a beam intensity of 240 microamps the dose per pass was 0.5 megarads. The curing step was conducted in a nitrogen atmosphere to provide the inert (oxygen free) atmosphere.

A film forming mixture was prepared from 10 parts of 2-hydroxypropyl acrylate (containing 10% of cellulose acetate degraded by exposure to 50 megarads of radiation) and 2 parts of expandable microspheres prepared in a manner similar to the previously described process wherein the monomer consisted of 75 parts vinylidene chloride, 25 parts acrylonitrile. The blowing agent was neopentane. To provide more viscosity 0.36 part of hydroxypropyl methyl cellulose was added to the mixture.

A film was cast on a polyester (Mylar) substrate with a draw down bar of 10 mil clearance and a second with a 15 mil clearance. Both films were cured according to the above described procedure. Both films had a paper-like writing surface.

Example 2

In a manner similar to Example 1 a film forming mixture was prepared from 10 parts of the hydroxypropyl acrylate monomer, 1 part of the expandable microspheres and 0.48 part of the hydroxy propyl methyl cellulose and cured. Similar results were found. The radiation degraded cellulose acetate may be omitted or replaced by undegraded cellulose acetate.

Example 3

A film forming mixture similar to the above was prepared from 10 parts of the acrylate monomer, 1 part of the expandable microspheres, 1 part of $CaCO_3$ and 0.5 part of the thickener and cured as before. The addition of the $CaCO_3$ resulted in a better writing surface than found with Example 2. It was also found that the parts of thickener could be increased without any material effect on the writing surface of the cured product.

Example 4

Example 2 was repeated except that the microspheres were replaced by expandable microspheres prepared from a monomer mixture containing 60 parts styrene and 40 parts acrylonitrile. Similar results were found.

Example 5

A film forming mixture was prepared from 10 parts of the acrylate monomer, 0.5 part of the microspheres of Example 4 and 6.5 parts of $CaCO_3$ and cured to produce a plastic paper in a manner similar to the above examples. The plastic paper had an excellent writing surface and was superior to any of the plastic paper produced acording to the previous examples.

Example 6

Ten (10) and 15 mil films were cast from a film forming mixture prepared from 10 parts of the acrylate monomer, 2.5 parts of the microspheres of Example 1 and 10 parts of $CaCO_3$ and cured as before to produce plastic paper with good writing surfaces.

Example 7

In a manner similar to Example 4 plastic paper was prepared by casting 10 and 15 mil films of a mixture of 15 parts of the acrylate monomer, 2.5 parts of the microspheres of Example 4 and 10 parts of $CaCO_3$ and curing same. Good writing surfaces were obtained. When a 15 mil film of the above mixture was cast on an ABS (acrylonitrile-butadienestyrene) substrate the cured product tended to adhere to the substrate but this may be corrected by applying a release agent to the ABS substrate.

Example 8

A mixture containing 16 gms. of 2-hydroxypropyl acrylate, 28 gms. of $CaCO_3$ filler and 4 gms. of expandable microspheres (75 parts vinylidene chloride, 25 parts acrylonitrile and 20 parts of neopentane blowing agent) prepared by the previously described method was cast as a film and cured. A plastic paper film with an excellent writing surface was obtained.

For comparison purposes a mixture similar to the above without the expandable microspheres was prepared, cast as a film and cured. The surface of the cured film was unsuitable for writing or printing. Similarly if the $CaCO_3$ is replaced by powdered polyethylene the resultant film is also unsuitable for writing and printing. However, a small amount of $CaCO_3$ (up to about 20%) may be replaced with powdered polyethylene without sacrificing the writing qualities of the cured film.

Example 9

A mixture employing the components of Example 8 was prepared from 9 parts of the acrylate monomer, 1 part of expandable microspheres, 16 parts of $CaCO_3$ and 1 part of degraded cellulose acetate. Films were cast using a 7, 15 and 25 mil draw down bar and cured. While a good writing surface was produced from the 15 and 25 mil cast films such was not the case with the 7 mil film. In the former cases the microspheres had foamed (expanded) due to the curing exotherm. But the microspheres had not foamed in the latter case apparently due to dissipation of the exotherm from the thin film. However, this may be overcome by heating the substrate or by employing a heated curing chamber to cause the beads to foam while the film is cured.

Example 10

A mixture similar to Example 9 was prepared except that the amount of the microspheres was increased to 2 parts and an additional 1 part of n-butyl acrylate monomer was included. The writability and toughness of the plastic paper were unaffected by the butyl acrylate. In place of butyl acrylate one may also use acrylonitrile. Small amounts of acrylic acid may also be used to increase toughness but if the acrylate monomer is completely replaced by acrylic acid a very brittle sheet results.

Example 11

A vinyl ester resin was prepared by reacting 2-hydroxyethyl acrylate in about equal molar proportions with maleic anhydride to form a half ester of maleic acid which was then reacted with a polyglycidyl ether of bisphenol A having an epoxide equivalent weight of about 186–192 (D.E.R. 331). The resulting resin contained about 30.5% of the acrylate, 25.0% of maleic anhydride and 44.5% of D.E.R. 331.

A film forming mixture was then prepared from 1 part of the vinyl ester resin, 2 parts of the microspheres of Example 1, 7.5 parts of $CaCO_3$ and 9 parts of 2-hydroxypropyl acrylate (containing 10% degraded cellulose acetate). A 15 mil film was cast and cured to produce a plastic paper with a good writing surface.

In a similar manner the vinyl ester resin was replaced by an unsaturated polyester prepared by condensing about equal molar amounts of maleic anhydride and dipropylene glycol. An unsaturated polyester prepared by condensing about equal molar amounts of an anhydride mixture (4 moles maleic anhydride/3 moles isophthalic acid) and a glycol mixture (4 moles of diethylene glycol/1 mole ethylene glycol) was also employed in a manner similar to the above to prepare plastic paper with a good writing surface.

Masking tape was applied to a substrate and a 25 mil coated film of the vinyl ester resin mixture, above, was formed on this masking tape surface and cured. An excellent writing surface was produced. Interestingly in the absence of a release coating one might expect the cured film to adhere strongly to the rough surface of the masking tape but due to the release coating no such problem was found and advantageously the plastic paper reproduced the rough surface resulting in a matte surface having excellent writing qualities. This example points out that a design can be readily reproduced from the substrate to the surface of the plastic paper.

According to this invention plastic paper can be readily prepared which does not require any subsequent treatment to impart a writable surface thereto. However, there is no reason why such previously described treatments known to the art cannot be employed if desired.

What is claimed is:

1. A process for producing plastic paper which comprises
    (a) forming a film of a mixture comprising from about 30 to 95 weight percent of a film-forming component polymerizable upon exposure to ionizing radiation, 0 to about 65 weight percent of an inorganic filler and from about 5 to 25 weight percent of expandable thermoplastic microspherical particles having encapsulated therein as a single, generally spherical occlusion a volatile, liquid foaming agent which is a non-solvent for the thermoplastic and becomes gaseous at a temperature below the softening point of the thermoplastic particle, wherein said particles are insoluble in said film-forming component and are generally impermeable to the liquid foaming agent; and
    (b) thermally expanding said microspherical particles while the film is exposed in an inert atmosphere to a sufficient amount of high energy ionizing radiation to polymerize said mixture;
        wherein said polymerizable component is a compatible mixture of about 75 to 100 weight percent of a hydroxyalkyl acrylate having an alkyl group of 2 to about 8 carbon atoms, 0 to about 15 weight percent of a resin having two or more free radical polymerizable unsaturated groups per molecule, and 0 to about 10 weight percent of a copolymerizable monomer.

2. The process of claim 1 wherein the polymerizable component contains a resin prepared by reacting about equivalent amounts of an unsaturated monocarboxylic acid with a polyepoxide.

3. The process of claim 1 wherein the thermoplastic microsphere is a copolymer of about 65 to 90 weight percent of vinylidene chloride and about 35 to 10 weight percent of acrylonitrile.

4. The process of claim 1 wherein the thermoplastic microsphere is a copolymer of about 10 to 90 weight percent styrene and about 90 to 10 weight percent of acrylonitrile.

5. The process of claim 1 wherein the amount of the filler varies from about 20 to 50 weight percent.

6. The process of claim 1 wherein the polymerizable component contains an unsaturated polyester resin.

7. A plastic paper prepared according to the process of claim 1.

8. A plastic paper prepared according to the process of claim 2.

9. A plastic paper prepared according to the process of claim 3.

10. A plastic paper prepared according to the process of claim 4.

11. A plastic paper prepared according to the process of claim 5.

12. A plastic paper prepared according to the process of claim 6.

References Cited
FOREIGN PATENTS

| | | | |
|---|---|---|---|
| 3,615,972 | 10/1971 | Morehouse Jr. et al. | 260—2.5 B |
| 3,556,934 | 1/1971 | Meyer | 260—2.5 B |
| 3,616,365 | 10/1971 | Stastny et al. | 204—159.15 |

JOHN C. BLEUTGE, Primary Examiner

R. B. TURER, Assistant Examiner

U.S. Cl. X.R.

117—138.8 A, 138.8 E, 138.8 F; 204—159.16; 260—2.5 B, 40 R, 40 TN, 41 R, 41 A, 41 B, 836, 837 R, 837 PV, 859, 862, 881, 884 885, 886